(12) United States Patent
Meek et al.

(10) Patent No.: US 10,246,840 B2
(45) Date of Patent: Apr. 2, 2019

(54) ONE-PIECE BASE ASSEMBLY

(71) Applicant: Traffic Management Products Limited, Sussex (GB)

(72) Inventors: Darryl Meek, Sussex (GB); Daniel Robinson, Sussex (GB)

(73) Assignee: Traffic Management Products, Ltd., Crawley (GB)

( * ) Notice: Subject to any disclaimer, the term of this patent is extended or adjusted under 35 U.S.C. 154(b) by 0 days.

(21) Appl. No.: 15/511,125

(22) PCT Filed: Sep. 15, 2015

(86) PCT No.: PCT/EP2015/071046
§ 371 (c)(1),
(2) Date: Mar. 14, 2017

(87) PCT Pub. No.: WO2016/041936
PCT Pub. Date: Mar. 24, 2016

(65) Prior Publication Data
US 2017/0254033 A1    Sep. 7, 2017

(30) Foreign Application Priority Data
Sep. 15, 2014  (GB) .................. 1416276.2

(51) Int. Cl.
| | |
|---|---|
| *F16L 3/00* | (2006.01) |
| *E01F 9/627* | (2016.01) |
| *E01F 9/681* | (2016.01) |
| *F16M 11/20* | (2006.01) |

(52) U.S. Cl.
CPC .............. *E01F 9/627* (2016.02); *E01F 9/681* (2016.02); *F16M 11/2064* (2013.01)

(58) Field of Classification Search
CPC .......... F21V 17/10; E01F 9/627; E01F 9/681; F16M 11/2064
USPC .................... 40/601.1, 607.1; 256/1; 404/10; 248/50, 219.2
See application file for complete search history.

(56) References Cited

U.S. PATENT DOCUMENTS

| | | | | |
|---|---|---|---|---|
| 4,269,534 A | * | 5/1981 | Ryan ........................ | E01F 9/681 256/1 |
| 2010/0254761 A1 | | 10/2010 | Wheeler, Jr. | |
| 2014/0255648 A1 | * | 9/2014 | Meek ...................... | E01F 9/681 428/137 |
| 2015/0340985 A1 | * | 11/2015 | Cantolino ............... | H02S 20/20 248/125.1 |

FOREIGN PATENT DOCUMENTS

| | | |
|---|---|---|
| FR | 2866659 | 8/2005 |
| JP | 2012188825 | 10/2012 |
| KR | 101081793 | 11/2011 |

OTHER PUBLICATIONS

International Search Report and Written Opinion in International Application Serial No. PCT/EP2015/071046 dated Dec. 18, 2015.

* cited by examiner

*Primary Examiner* — Gwendolyn W Baxter
(74) *Attorney, Agent, or Firm* — Haugen Law Firm DLLP

(57) ABSTRACT

A one-piece resiliently deformable base assembly for an item of street furniture or a barrier, the base assembly comprising an elongate street furniture receiving portion and a base mounting portion, wherein the base assembly is formed from a polyurethane polymer, and the base mounting portion comprises a flange including one or more fixing elements.

12 Claims, 4 Drawing Sheets

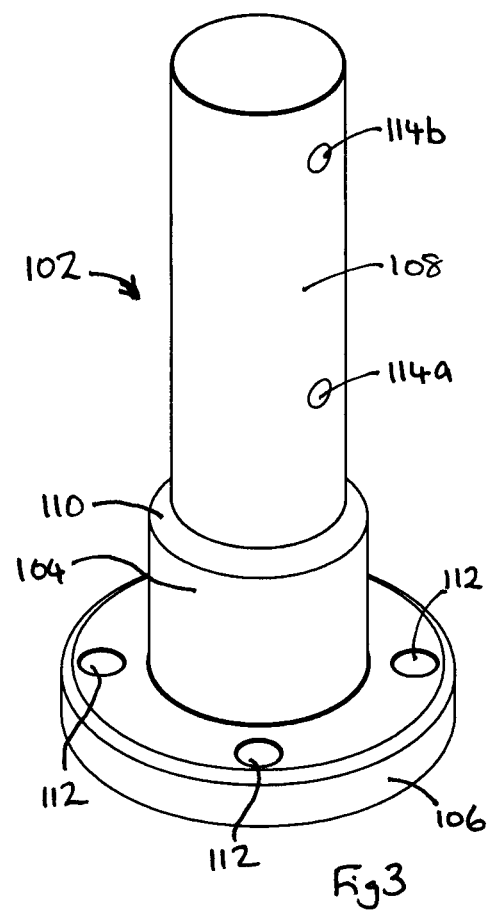

ONE-PIECE BASE ASSEMBLY

The present invention relates to a one-piece, resiliently deformable, base assembly for items of street furniture or barriers in which the item of street furniture or barrier is maintained substantially upright in a rest configuration and which is urged to return to its rest configuration after deflection.

Flexible base assemblies have been known for some time. They are typically used to support items of street furniture, such as road signs and traffic delineators and are designed to deform and then recover if impacted by a vehicle or other moving object. Thus, they are typically self-righting.

Early flexible bases were only able to deform and recover when a body carried by the base assembly was impacted from a specific direction. These were then improved to allow for recovery from impacts in any direction. Recently, further improvements have been made such that the flexible bases are self-fronting. That is to say, they are biased to a specific orientation.

However, as these developments to the bases have been made, they have become increasingly more complicated and now often include spring arrangements, pulley arrangements and/or various cam arrangements in order to provide all of the featured restorative forces. This greater complexity has resulted in increased manufacturing costs and has also increased the likelihood of failure of the base as a whole.

An alternative base assembly which is self-righting and self-fronting is described in WO2013/057504. This document describes a two-part flexible base assembly. However, as described in WO2013/057504, it is necessary to produce an insert element of a first material and then mould around the insert element a base element body of a different material to form the base assembly described therein. This requires two separate moulds and a two-stage production process.

The present inventors have found that a one-piece (i.e. unitary or monolithic) resiliently deformable base assembly can be provided which is self-supporting, self-righting and is self-fronting.

According to a first aspect of the invention, there is provided a self-righting and self-fronting base assembly for an item of street furniture or a barrier, the base assembly comprising a base mounting portion and an elongate street furniture receiving portion projecting from the base mounting portion, wherein the base assembly is formed as a monolithic component from a polyurethane polymer, and the base mounting portion comprises one or more fixing elements.

The use of a polyurethane polymer material as the material for the base assembly has been found to provide the necessary resistance to deflection away from an upright configuration (i.e. out of a vertical plane) and also against rotation about a vertical axis without the need for additional components. Thus, the one-piece or monolithic base assembly according to the invention can be said to be both self-righting and self-fronting. A base assembly according to the present invention requires only a single mould and a one-stage manufacturing process.

It is unexpected that a monolithic polyurethane base assembly as claimed may be provided that is inherently self-righting (i.e. is able to re-orient the street furniture receiving portion to a substantially vertical orientation following a deflection of this portion out of a vertical plane, e.g. following an impact by a vehicle) and self-fronting (i.e. is able to re-orient the street furniture receiving portion to a specific (rest) angular orientation following the receiving portion being twisted or rotated away from its rest orientation).

For ease of reference, reference to "street furniture" herein includes barriers, such as for example, crowd control barriers.

The street furniture receiving portion receives in use an item of street furniture. In the context of the present invention, the street furniture receiving portion may be in the form of an elongate post and the respective item of street furniture suitably includes one or more complementary brackets, an aperture or a channel which is sized and shaped to receive therein the post in order to couple the item of street furniture to the base assembly. However, other methods of securing the item of street furniture to the street furniture receiving portion of the base assembly are within the scope of the present invention. Thus, the item of street furniture is secured directly to the street furniture receiving portion of the base assembly in use and thereby the item of street furniture may be secured to a substrate via the base assembly.

The street furniture receiving portion may be an upstanding receiving portion in certain embodiments. The skilled person will appreciate that reference to "upstanding" is to be construed as meaning "upstanding in use".

The base assembly may be secured in use to a substrate via the fixing element(s) of the base mounting portion. The base mounting portion suitably extends outwards (e.g. radially or laterally outwards) from the street furniture receiving portion and may include a flange portion. The, some of the, or all of the fixing elements may be apertures defined by the flange portion.

The polyurethane body of the base assembly may include one or more filler materials conventionally associated with elastomers. Such fillers may include carbon black and silica. Additionally or alternatively, the polyurethane may include one or more reinforcing materials, such as glass fibres, carbon fibres or the like.

The polyurethane material provides desirable physical properties and demonstrates acceptable resistance to damage from environmental factors, such as liquids (organic and aqueous), light, weather, etc.

The base assembly is particularly suited for use with an item of street furniture. Thus, according to a second aspect of the invention, there is provided a street furniture base assembly or a barrier base assembly as defined above.

In order to achieve a suitable balance between maintaining the item of street furniture in the desired configuration and orientation (e.g. substantially upright) in use and allowing it to be deflected in the event of an impact or sustained force, the polyurethane material from which the base assembly is formed suitably has a hardness of from 70 to 100 on the Shore A hardness scale. In certain embodiments of the invention, the polyurethane from which the base assembly is formed has a hardness from 80 to 90 on the Shore A hardness scale.

In an embodiment of the invention, the base assembly further includes an intermediate portion located between the street furniture receiving portion and the base mounting portion, wherein the intermediate portion has a width (e.g. a minimum width) which is greater than the corresponding width of the street furniture receiving portion, and the base mounting portion extends outwards (e.g. radially or laterally outwards) from the intermediate portion. The intermediate portion may have a substantially constant width/diameter and consequently a substantially constant cross-sectional shape or it may have a variable width, for example a width which increases from the street furniture receiving portion to the base mounting portion.

The skilled person will appreciate that the force required to deflect an item secured to the base assembly may be at least in part determined by the physical characteristics of the intermediate portion (e.g. shape, width/diameter, length, etc.). Similarly, the restorative force exerted by the base assembly when in a deflected configuration may also, at least in part, be determined by the physical characteristics of the intermediate portion.

An item of street furniture may engage and be at least partially supported by a shoulder portion defined between the street furniture receiving portion and the intermediate portion. The shoulder portion may define a step change in the in the width of the base assembly between the street furniture receiving portion and the intermediate portion. Thus, the shoulder portion may extend radially outwards from the street furniture receiving portion to define a substantially planar annular shoulder surface. In use, the plane of the shoulder portion may be substantially parallel to the plane of a substrate to which the base assembly is secured (e.g. a horizontal plane). Alternatively, the shoulder portion may be sloped or inclined. An inclined shoulder portion is advantageous in preventing or minimising the risk of a bottom portion of the item of street furniture becoming trapped between the street furniture receiving portion and the intermediate portion when the base assembly is deflected. It should be appreciated that the sloped or inclined shoulder portion may be linear (i.e. the incline or slope defines a straight line) or it may be curved, such as concave, convex or bell-shaped.

The or each fixing element carried by the base mounting portion is suitably a hole, i.e. a through hole or bore extending through the base mounting portion. Such holes are adapted to receive therethrough a suitable fixing, such as a bolt, which may be used to secure the base assembly to a substrate.

Suitably, the holes are arranged as pairs of opposed holes. Thus, the holes may be circumferentially spaced around the base mounting portion such that each hole is diametrically opposed to its partner hole. In an embodiment of the invention, the holes are equally spaced circumferentially about the base mounting portion. In this way, the base assembly is better able to withstand deflection forces from any direction.

It has been found that the greater the ratio of the distance between opposed holes of the base mounting portion to the diameter of the intermediate portion (where present) or the street furniture receiving portion, the greater the force that is experienced at one of the or several of the holes in the event of a deflection of the base assembly. Thus, it is desirable to minimise the distance by which the holes extend beyond the street furniture receiving portion/intermediate portion of the base assembly. In an embodiment of the invention, the base mounting portion includes an even number of fixing elements in the form of holes defined by a flange extending outwards from an intermediate portion or the street furniture receiving portion (as appropriate) and the holes are arranged about the flange as opposed pairs, and wherein the ratio between the width or diameter of the street furniture receiving portion/intermediate portion to the distance between a pair of opposed holes is from 1:1.1 to 1:25, suitably 1:1.1 to 1:2. In this way, the force experienced at one or more of the holes in the event of the base assembly being subjected to a deflecting force is minimised, while still allowing for access to the fixings located in use within the holes.

In the context of the present invention, the width or diameter of the street furniture receiving portion or, where present, the intermediate portion, is measured parallel to a diameter between the opposed holes. Thus, the diameters are aligned with each other. Furthermore, the distance between a pair of opposed holes is considered to be the distance between the centres of the holes.

Many lower portions of items of street furniture are adapted to be secured to base assemblies including a cylindrical post. Accordingly, the street furniture receiving portion of the present invention may be a substantially cylindrical post. However, a street furniture receiving portion comprising a post having a different cross-sectional shape is possible within the scope of the invention, including a post having a triangular, rectangular, pentagonal, hexagonal, heptagonal, octagonal, etc. cross-sectional shape. Similarly, the intermediate portion, where present, may have a cross-sectional shape as described above and the cross-sectional shape of the intermediate portion may be the same as or different to the cross-sectional shape of the street furniture receiving portion. Thus, the street furniture receiving portion may comprise a substantially upstanding post.

The street furniture receiving portion may include one or more securing elements to secure thereto an item of street furniture in use. The or each securing element may comprise a hole (i.e. a through hole or a bore) defined through the street furniture receiving portion though which a fixing may be located wherein the fixing retains the item of street furniture in a desired orientation relative to the base assembly.

According to a third aspect of the invention, there is provided a method of producing a one-piece base assembly as defined anywhere herein, wherein the method includes providing a mould for the base assembly, locating within the mould a polyurethane pre-cursor material, and allowing or causing the polyurethane pre-cursor material to cure in-situ to form a polyurethane polymer.

Elastomers such as polyurethane typically comprise a precursor material, such as one or more monomers or non-vulcanised unsaturated rubber components, which is then reacted, chemically altered or vulcanised to achieve the final elastomeric product. The conversion of the precursor material into the final form of the elastomer is referred to herein as "curing". The curing step may include the addition of heat, pressure, a catalyst and/or a reactive component.

The mould defines a street furniture receiving portion, a base mounting portion and, optionally, an intermediate portion as defined herein.

The polyurethane pre-cursor material is suitably cured by heat. Accordingly, the step of curing the polyurethane pre-cursor material includes heating the mould with the polyurethane pre-cursor material located therein.

In order that the pre-cursor material properly fills the mould, the method may include the steps of heating the mould to a first temperature, locating the polyurethane pre-cursor material within the mould when the mould is at the first temperature, maintaining the mould at the first temperature for a pre-determined period of time. Further steps may include demoulding the base assembly and heating the base assembly at a second temperature for a second pre-determined time to cause the polyurethane pre-cursor material to cure completely in the event that the step of heating the mould to a first temperature for a first period of time results in a partial curing of the polymer. The first and second temperatures may be the same or different. Suitably, the first and second temperatures are both greater than 30°

C., suitably greater than 50° C. For example, the first temperature may be 80-90° C. and the second temperature may be 75-85° C.

In an embodiment of the invention, the method includes a moulding step in which the polyurethane pre-cursor material is located within a mould at the first temperature and the curing step includes locating the moulded product within an oven, wherein the temperature of the oven is at the second temperature. The mould is suitably maintained within the oven for a period of time sufficient to cure properly the polyurethane pre-cursor material.

Further steps may include removing the moulded base assembly from the mould (demoulding) and cooling the moulded product after the polyurethane material has cured.

In an embodiment of the invention, the method includes the steps of (i) heating a mould to a first temperature; (ii) pouring into the heated mould a polyurethane pre-cursor material; (iii) maintaining the mould at the first temperature for a first pre-determined time; (iv) demoulding the moulded base assembly; (v) locating the moulded base assembly in an oven at a second temperature; and (vi) maintaining the moulded base assembly in the oven at the second temperature for a second pre-determined time. The first and second temperatures may be the same or different and both may be greater than 50° C., suitably greater than 60° C.

According to a fourth aspect of the invention, there is provided a combination of an item of street furniture or a barrier and a one-piece base assembly as defined anywhere herein, wherein the item of street furniture or barrier is secured to the street furniture receiving portion of the base assembly.

The skilled person will appreciate that the term "street furniture" is intended to cover items such as traffic signs, traffic bollards, lane delineators, lights and so forth. However, it is not limited to roads and is also intended to cover signs, bollards, delineators, barriers, lights, etc. when used in alternative environments, such as railways and airports. Thus, "street furniture" in the context of the present invention includes any supported body adapted to be carried by a base assembly, which is typically upstanding, and which is at risk of being hit by a moving vehicle.

With regard to barriers, it is often desired to provide barriers to prevent access to certain restricted areas, where the barriers are designed to fail or collapse in certain situations, such as emergency situations. An example of such a situation is crowd control barriers used for example at sports stadia and the like. In normal use, the barriers are used to prevent access, e.g. to the sports pitch or arena. However, in the event of an emergency situation, such as a fire, the barriers may be deformed or deflected to allow passage to an area of safety. Thus, the supported body may be a barrier panel or part of a barrier panel.

The street furniture receiving portion of the base assembly may comprise a post carrying or defining one or more securing elements and the item of street furniture may be secured to the street furniture receiving portion via the or each securing element. In embodiments in which the street furniture receiving portion defines one or more securing elements in the form of holes, the item of street furniture may be secured to the base assembly via one or more fixings which are located through respective holes.

The skilled person will appreciate that the features described and defined in connection with the aspects of the invention and the embodiments thereof may be combined in any combination, regardless of whether the specific combination is expressly mentioned herein. Thus, all such combinations are considered to be made available to the skilled person.

An embodiment of the invention will now be described, by way of example only, with reference to the accompanying drawings in which:

FIG. 2a is a cross-sectional view of the base assembly shown in FIG. 1 and an attached item of street furniture;

FIG. 2b is an enlarged view of part of FIG. 2a;

FIG. 3 is a perspective view of a base assembly according to a second embodiment of the invention;

FIG. 4b is a cross-sectional view of the street furniture/base assembly combination through the line A-A indicated in FIG. 4a.

For the avoidance of doubt, the skilled person will appreciate that in this specification, the terms "up", "down", "front", "rear", "upper", "lower", "width", etc. refer to the orientation of the components as found in the example when installed for normal use as shown in the Figures.

Figure 1:
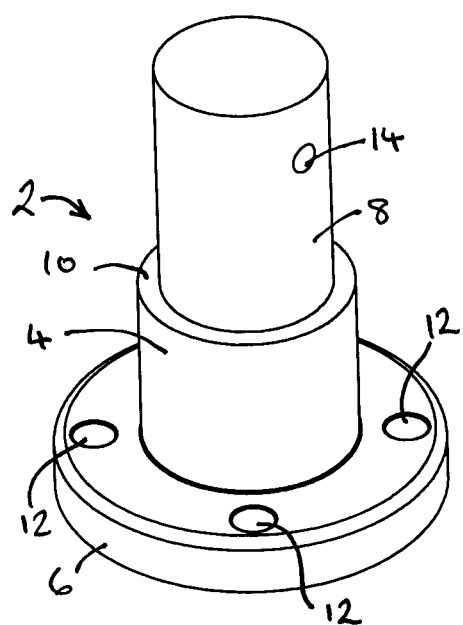
FIG. 1 is a perspective view of a one-piece flexible base assembly according to a first embodiment of the invention.

FIG. 1 shows a one-piece resiliently deformable base assembly 2 formed from a three component polyester-based polyurethane pre-cursor material sold under the trade name Diprane 530 and available from Dow Chemicals. The pre-cursor material includes a polyol component, an isocyante component and a chain extending component. The formation of the base assembly 2 is described hereinbelow.

The base assembly 2 comprises an intermediate portion 4 located between a base mounting portion in the form of a flange 6 which extends radially outwards from the bottom of the intermediate portion 4, and a street furniture receiving portion in the form of an upwardly projecting post 8.

In this embodiment, a shoulder 10 is defined between the intermediate portion 4 and the upwardly projecting post 8. The shoulder is formed by a step-change in the radius of the base assembly 2 between the intermediate portion 4 and the upwardly projecting post 8, wherein the diameter of the post 8 is less than the diameter of the intermediate portion 4. Thus, the shoulder 10 defines a planar, annular, upwardly facing surface which is substantially horizontal in use.

The flange 6 defines therein four circumferentially spaced holes 12, which are arranged as opposed pairs. The holes are sized and configured to receive therethrough a respective fixing which in turn secures the base assembly 2 to a substrate, such as a road, pavement or similar, in use. The fixing is suitably a bolt which passes through the flange 6 and is received in a threaded bore defined beneath the base assembly in use.

In this embodiment, the diameter of the intermediate portion 4 has a diameter of 60 mm and the four holes 12 have a PCD (pitch circle diameter) of 86 mm. Accordingly, the ratio of the width of the intermediate portion 4 to the distance between the centres of opposed holes 12 is 1:1.43.

The upwardly projecting post 8 defines therethrough a securing element in the form of a mounting hole 14 which extends diametrically through the post 8.

Figures 2A, 2B:
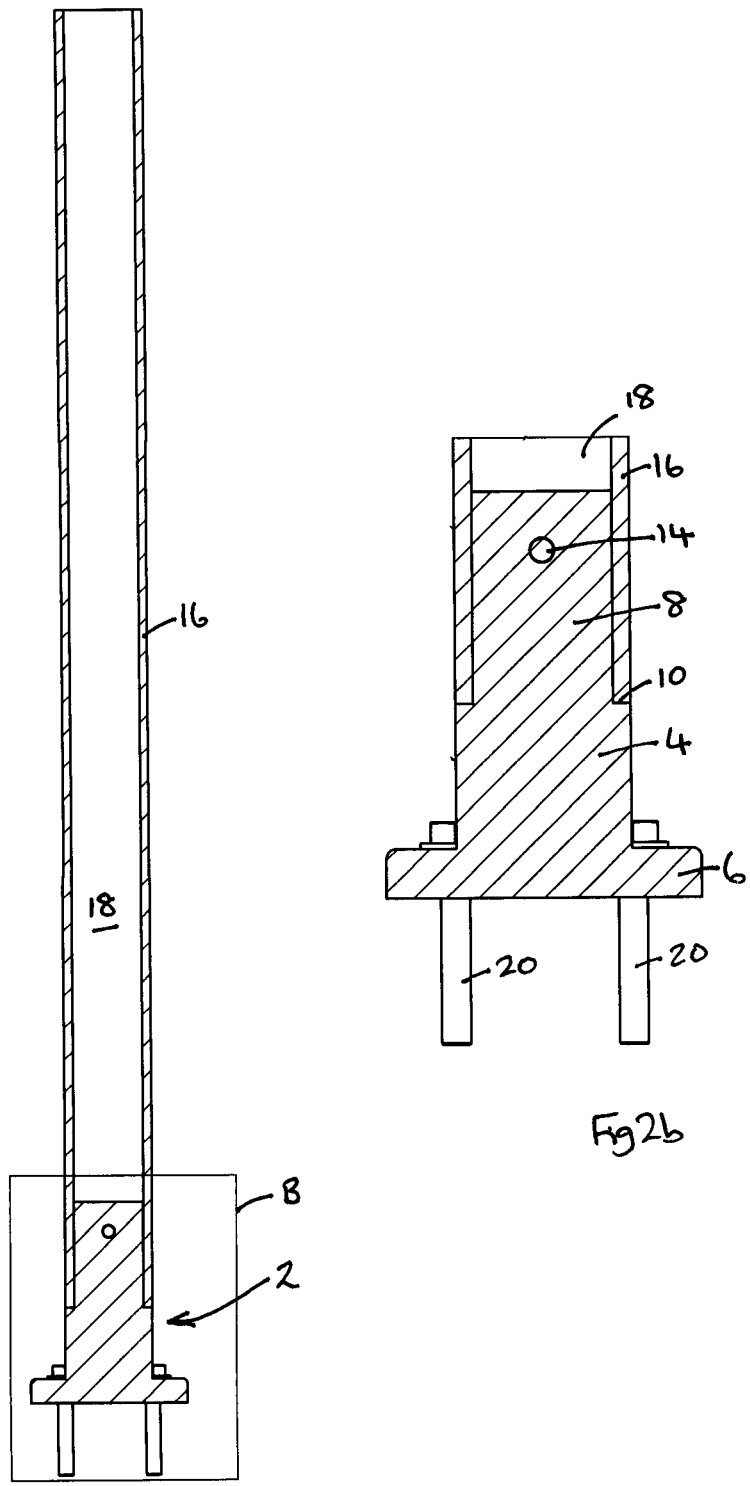

FIG. 2a shows an item of street furniture in the form of a cylindrical road lane delineator 16 secured to the base assembly 2 and FIG. 2b shows an enlarged view of the base assembly/delineator as indicated by the box B. As can be seen from FIGS. 2a and 2b, the delineator 16 defines an inner channel 18 which has a diameter that is substantially identical to the diameter of the upwardly projecting post 8.

In this way, the post 8 is located in use within the channel 18 and maintains the delineator 16 substantially upright in use. The bottom peripheral edge portion of the delineator 16 sits upon the shoulder 10 defined between intermediate portion 4 and the upwardly projecting post 8. Thus, the annular shoulder 10 acts as a support surface for the delineator 16. The delineator 16 is secured to the post 8 via a nut and bolt arrangement, wherein a bolt passes through a hole (not shown) formed through the cylindrical delineator body and through the mounting hole 14 defined by the post 8 and is secured by a complementary nut. The skilled person will appreciate that there are numerous alternative methods for securing a cylindrical item of street furniture to the base assembly 2.

The base assembly 2 is mounted to a suitable substrate via four bolts 20, two of which are shown in FIGS. 2a and 2b.

A second embodiment of the invention is shown in FIGS. 3, 4a, 4b and 4c. In the second embodiment, elements which correspond to similar elements in the first embodiment are given like reference numerals, but with a "100" prefix. Thus, the element referred to with reference number 10 in the first embodiment will be referred to as reference number 110 for the corresponding element in the second embodiment.

FIG. 3 shows a base assembly 102. The base assembly is substantially identical to the base assembly 2 described above in that it includes an intermediate portion 104, a flange 106 extending radially outwards from the intermediate portion 104, an upwardly projecting post 108 and four holes 112 defined by the flange 106.

However, the base assembly 102 differs from the base assembly 2 in that the base assembly 102 defines an inclined shoulder portion 110 such that the diameter of the base assembly 102 changes smoothly between the intermediate portion 104 and the narrower post 108. In this embodiment, the inclined shoulder portion 110 is angled at 45°.

In the embodiment shown, the change in diameter is constant which results in a linear shoulder portion 110. However, a non-linear change in diameter is also anticipated, such that the shoulder portion 110 is concave or convex.

A further difference in this embodiment is that the upwardly projecting post 108 is axially longer than the corresponding post 8 of the first embodiment. The upwardly projecting post 108 defines two mounting holes 114a, 114b that extend diametrically through the post 108.

The ratio of the width of the intermediate portion 104 to the distance between the centres of opposed holes 112 is maintained at 1:1.43 by maintaining the diameter of the intermediate portion 104 and the PCD of the holes 112 the same as in the first embodiment.

Figure 4C:
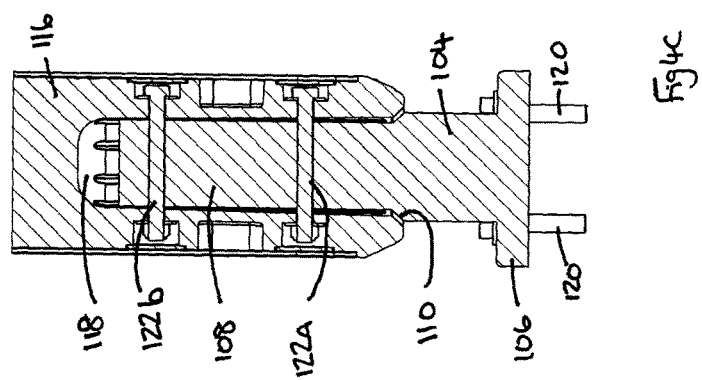
FIG. 4c is an enlarged view of part of FIG. 4b.
Figure 4B:
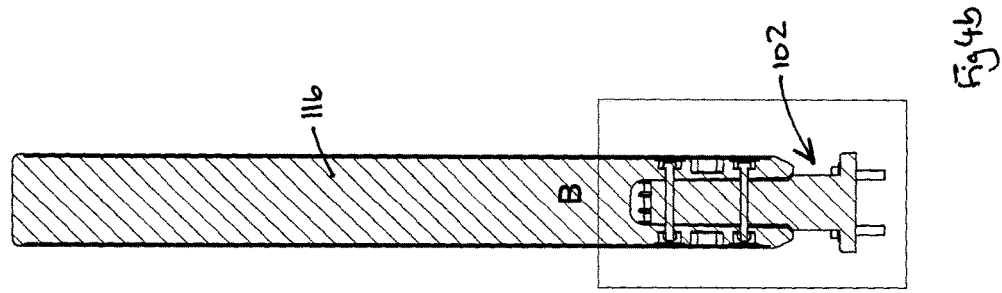
Figure 4A:
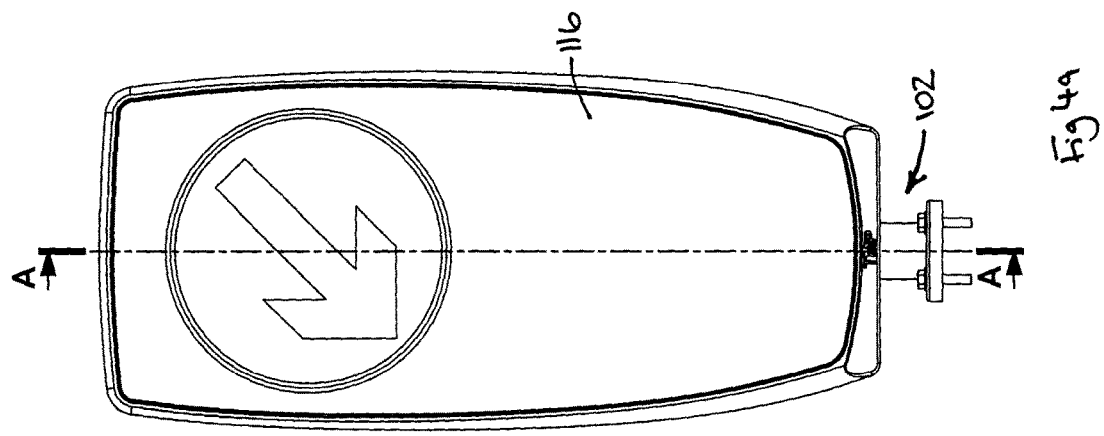
FIG. 4a is a front elevational view of the base assembly shown in FIG. 3 and an attached item of street furniture.

FIG. 4a shows a front elevational view of an item of street furniture in the form of a road sign blade 116 carried by the base assembly 102. It will be understood by the skilled person that such road signs tend to be mounted to islands formed in the middle of roads to indicate to vehicles which side of the sign they must pass. Thus, the substrate in this case will be an island formed in the road.

FIG. 4b shows a cross-sectional view of the blade 116 through the line A-A indicated in FIG. 4a. This view shows the coupling between the blade 116 and the base assembly 102. This coupling is shown in more detail in FIG. 4c, which shows an enlarged view of it.

The blade 116 defines a cylindrical bore 118 in a lower central portion thereof. The post 108 has a diameter which is substantially identical to the inner diameter of the bore 118 such that the post 108 is located in use within the bore 118. In this way, the post 108 maintains the blade 116 substantially upright in use. The bottom peripheral edge portion of the blade 116 includes an inwardly chamfered portion which is angled at 45° to match the incline of the shoulder 110. The chamfered portion of the blade 116 sits upon the shoulder 110 defined between intermediate portion 104 and the upwardly projecting post 108. Thus, the inclined shoulder 110 acts as a support surface for the blade 116. The inclined shoulder prevents the bottom of the blade becoming trapped between the post 108 and the intermediate portion 104 in the event that the blade 116 is impacted and the base assembly 102 is deflected. Should the blade 116 become trapped in this way, it may prevent the base assembly from self-righting.

The blade 116 is secured to the post 108 via two nut and bolt arrangements, wherein a bolt 122a passes through the mounting hole 114a defined by the post 108 and is secured by a complementary nut. A second bolt 122b passes through the mounting hole 114b and is also secured by a complementary nut. Again, the skilled person will appreciate that there are numerous alternative methods for securing an item of street furniture having a cylindrical bore to the base assembly 102.

The base assembly 102 is mounted to the substrate via four bolts 120, two of which are shown in FIGS. 4a, 4b and 4c.

To mould the base assembly 2, 102, appropriate quantities of each of the three components of the polyurethane precursor material Diprane 530 (trade mark) are mixed together and poured into a mould (not shown) which has been pre-heated to about 85-90° C. The mould is maintained at about 85-90° C. for about 30-40 minutes after which time the outer surface of the assembly 2, 102 has cured sufficiently that the base assembly 2, 102 can be removed from the mould. After demoulding, the partially cured base assembly is placed in an oven at about 80° C. for 12-16 hours to cure fully.

It will be appreciated that different ratios of the three components will result in a polyurethane polymer having a different hardness on the Shore A scale. For example, a mixture of 111:12:100 by weight of polyol:chain extender: isocyante will give a product having a hardness (Shore A) of 75; and a mixture of 78:13.5:100 by weight will give a product having a hardness of 85.

It will be appreciated that the base assembly of the present invention may be used to support a wide range of very different items of street furniture such that the combination of the item of street furniture and the base assembly is self-righting in the event of an impact, e.g. by a vehicle, and also self-fronting in the event of an attempted act of vandalism or where the item of street furniture is twisted as the result of an impact.

Moreover, it will be appreciated that the base assemblies as shown in the Figures and described above may carry a barrier, such as a crowd control fence or part thereof. As noted above, it is occasionally necessary to provide a barrier which is collapsible in an emergency situation, but which is normally maintained in a substantially upright orientation. The base assembly of the present invention is capable of maintaining a barrier in a substantially upright orientation in normal use, but in an emergency situation, the barrier may be deflected to a substantially horizontal orientation. After the emergency situation has passed, the barrier would revert to its upright orientation.

It will further be appreciated that the base assembly may be located such that the flange is substantially vertical and the post projects horizontally, for example, where the item of street furniture may indicate if a vehicle is too wide to proceed. Alternatively, the flange may be secured to a downwardly facing substrate and the intermediate portion/post depends downwardly from the flange, for example to warn drivers that their vehicles are too high to pass beneath an upcoming obstruction. In such cases, references above to the orientations of the various components will need to be modified as appropriate by the skilled person.

The invention claimed is:

1. A self-righting and self-fronting base assembly for supporting an item of street furniture or a barrier, the base assembly comprising a base mounting portion and an elongate street furniture receiving portion projecting from the base mounting portion, wherein the base assembly is formed as a monolithic component from a polyurethane polymer, and the base mounting portion comprises one or more fixing elements, the base assembly further comprising an intermediate portion located between the street furniture receiving portion and the base mounting portion, wherein the intermediate portion has a minimum width which is greater than the corresponding width of the street furniture receiving portion, and the base mounting portion extends outwards from the intermediate portion.

2. A base assembly according to claim 1, wherein the polyurethane polymer has a hardness of from 70 to 100 on the Shore A scale.

3. A base assembly according to claim 1, wherein a shoulder portion is defined between the street furniture receiving portion and the intermediate portion and the shoulder portion is inclined, curved or defines a step change in the width of the assembly between the street furniture receiving portion and the intermediate portion.

4. A base assembly according to claim 3, wherein the shoulder portion defines a progressive change in the width from the street furniture receiving portion to the intermediate portion and is linear, concave or convex.

5. A base assembly according to claim 1, wherein the or each fixing element comprises a hole defined by the base mounting portion.

6. A base assembly according to claim 5, wherein the base assembly defines one or more pairs of opposed holes.

7. A base assembly according to claim 5, wherein the base mounting portion comprises a flange and the one or more holes are defined through the flange.

8. A base assembly according to claim 1, wherein the base mounting portion includes an even number of fixing elements in the form of holes defined therethrough, the holes are arranged about the base mounting portion as opposed pairs, and (i) a ratio between the width of the street furniture receiving portion to the spacing between a pair of opposed holes is from 1:1.1 to 1:25; or (ii) the base assembly further includes an intermediate portion located between the street furniture receiving portion and the base mounting portion, wherein the intermediate portion has a width which is greater than the corresponding width of the street furniture receiving portion, and the base mounting portion extends outwards from the intermediate portion, and the ratio between the width of the intermediate portion to the spacing between a pair of opposed holes is from 1:1.1 to 1:25.

9. A base assembly according to claim 1, wherein the street furniture receiving portion includes one or more securing elements adapted to secure to the street furniture receiving portion an item of street furniture or a barrier in use.

10. A method of producing the self-righting and self-fronting base assembly of claim 1, wherein the method includes providing a mould for the base assembly, locating within the mold a polyurethane pre-cursor material, and allowing or causing the polyurethane pre-cursor material to cure or partially cure in-situ to form the base assembly.

11. A method according to claim 10, wherein the curing step comprises heating the mould containing the polyurethane pre-cursor material.

12. A combination of an item of street furniture or a barrier and the self-righting and self-fronting base assembly as in claim 1, wherein the item of street furniture or barrier is secured to the street furniture receiving portion of the base assembly.

* * * * *